United States Patent [19]

Spillman, Jr.

[11] Patent Number: 4,830,449

[45] Date of Patent: May 16, 1989

[54] POLARIMETRIC FIBER OPTIC SPEED SENSOR

[75] Inventor: William B. Spillman, Jr., Charlotte, Vt.

[73] Assignee: Simmonds Precision Products, Inc., Tarrytown, N.Y.

[21] Appl. No.: 97,874

[22] Filed: Sep. 17, 1987

[51] Int. Cl.$^4$ .................... G02B 6/26; G02B 6/36; H01J 5/16

[52] U.S. Cl. .................. 350/96.15; 350/96.2; 350/96.21; 250/227; 250/225

[58] Field of Search ............... 350/96.15, 96.21, 96.2; 250/227, 225; 356/27, 33, 349, 345, 350, 351

[56] References Cited

U.S. PATENT DOCUMENTS

| | | | |
|---|---|---|---|
| 3,791,736 | 2/1974 | Newburg | 356/27 |
| 4,334,777 | 6/1982 | Bien et al. | 356/349 |
| 4,420,251 | 12/1983 | James et al. | 356/32 |
| 4,459,477 | 7/1984 | Asawa et al. | 250/227 |
| 4,516,021 | 5/1985 | Taylor | 250/227 |
| 4,534,222 | 8/1985 | Finch et al. | 73/653 |
| 4,564,289 | 11/1986 | Spillman, Jr. | 356/33 |
| 4,642,458 | 2/1987 | Jackson et al. | 250/225 |
| 4,697,876 | 10/1987 | Dyott | 250/227 |

Primary Examiner—William L. Sikes
Assistant Examiner—Georgia Y. Epps
Attorney, Agent, or Firm—Cushman, Darby & Cushman

[57] ABSTRACT

A speed sensor for sensing the rotational speed of an N bladed fan in a turbo-machine application includes a polarization-preserving optical circuit positioned adjacent the locus described by the remote ends of the blades. First and second sets of sensing segments of the optical circuit are spaced apart from one another by an angular spacing equal to that of the blades and with the first set of sensing segments angularly offset from the second set and with the first and second sets cross-coupled to transpose the polarization modes. The orthogonal polarization modes of optical energy launched into the optical circuit are subjected to phase shifts as the optical fiber is perturbed by pressure variations caused by the moving fan blades with the cumulative phase shift in each portion of the optical circuit subtracted as a consequence of the cross-coupling and the resulting light output having an intensity or other characteristics that vary as a function of the rotational speed of the fan.

9 Claims, 2 Drawing Sheets

POLARIMETRIC FIBER OPTIC SPEED SENSOR

BACKGROUND OF THE INVENTION

The present invention relates to apparatus for sensing rotational speed and, more particularly, to speed sensors for sensing the speed of rotation of a fan or fan-like structure about an axis of rotation.

Various electrical devices are known for sensing rotational speed, including the speed of rotation of a multi-bladed fan. For example, electric sensors using magnetic fields or capacitive effects are known in which the rotating structure generates an electrical pulse signal as a function of the rotational speed. For example and in the context of a rotating fan, magnetic sensors are known in which a magnetic pick-up coil or a Hall effect sensor is positioned in close proximity to the ends of the fan blades. As the fan rotates, the ends of the blades move pass the sensor to perturb the magnetic field adjacent the sensor to generate a sequence of electrical pulses having a repetition rate that is proportional to rotational speed. Capacitive-type sensors operate in a similar manner and usually employ a simple bridge circuit that detects a change in the capacitance between the sensor and the blade end to produce a pulse output. Other types of sensors use a light beam that is periodically interrupted, e.g., chopped, by the motion of the fan blades to cause a photo-sensor to produce a pulse output having a pulse repetition rate that varies with the rotational speed of the fan blade.

In general, the type of speed sensor systems discussed above perform there intended function, although sensors that can be characterized as electrical tend to produce EMI and, conversely, are EMI sensitive. In certain environments, for example, in sensing the speed of rotation in aircraft fan-jets or other turbo-machinery, shielding is required to prevent or minimize adverse EMI effects. In general, shielding adds to the capacitive impedance in any electrical system and can adversely limit the upper operational frequency of the system as well as add undesirable weight in an airborne application. Traditional photo-electric systems, in addition to requiring shielded components in many applications, are sensitive to and can be operationally compromised by the accumulation of debris and other light obscuring contaminants on their optically active surfaces or in the optical path between the light source and its receiver.

One of the trends in the instrumentation field is the incorporation of optical fibers into the instrument system to take advantage of their lightweight, immunity to electric and magnetic fields, and their high bandwidth. For example, the output of electrical sensors can be converted to light pulses and transmitted via unshielded optical fiber to a receiver for further processing. In the context of prior photo-electric systems, light energy can be also be directly launched into a fiber for transmission to a remote processing location. In this latter situation, the optical path is nonetheless 'open' and sensitive to light obscuring contaminants in a manner analogous to the traditional photo-electric system. Ideally, any system that uses optical energy should be closed, that is, not subject to the effects of light obscuring contaminants.

SUMMARY OF THE INVENTION

In view of the above, it is a primary object of the present invention, among others, to provide a rotational speed sensor that senses the speed of rotation in an optical manner and which uses a closed optical path that is immune to environmental effects.

It is another object of the present invention to provide a rotational speed sensor that senses the speed of rotation of a fan or fan-like structure that uses a closed optical path immune to EMI effects.

It is a further object of the present invention to provide a rotational speed sensor that senses the speed of rotation of a fan or fan-like structure in turbo-machinery and which is relatively immune to environmental effects.

In view of these objects, and others, the present invention provides a rotational speed sensor for sensing the speed of rotation of a fan or fan-like structure about an axis of rotation. A polarization-preserving optical circuit is defined adjacent the path described by the rotating fan blades with variations in the local pressure caused by the passage of a fan blade affecting the transmission of the light in the optical circuit so that at least one characteristic of the output light from the circuit is proportional to the speed of rotation of the fan or fan-like structure. The optical circuit includes first and second serially connected polarization-preserving portions with the respective polarization orientations of the first portion cross-coupled to the second portion with at least one segment of the first and second serially connected portions mounted adjacent the ends of the fan blades so that the local pressure variations will cause phase shifts in the light transmitted through the circuit. Optical energy introduced into the optical circuit having orthogonal polarization modes is transmitted into the optical circuit with the periodic stressing of the core by the passage of a fan blade affecting the transmission of the orthogonal polarization modes and inducing a phase shift. The phase shifted energy is cross-coupled into the second portion of the optical circuit with the induced phase shift effect continued in the second portion of the circuit to provide output light having characteristics that are proportional to the speed of rotation of the fan.

In a preferred form of the invention, the speed sensor is used to sense the rotational speed of an N bladed fan in a turbo-machine application and includes a polarization-preserving optical circuit positioned adjacent the locus described by the remote ends of the blades. Selected sensing segments of the optical circuit are spaced apart from one another by an angular spacing equal to that of the N blades with a first set of segments angularly offset from the other set and cross-coupled to one another to transpose the polarization modes between the first and second sets of segments. The orthogonal polarization modes of the optical energy introduced into the optical circuit are subjected to phase shifting as the sensing segments of the optical circuit are perturbed by pressure variations caused by the moving fan blades. The cumulative phase shift in each portion of the optical circuit is subtracted as a consequence of the cross-coupling and the resulting light output has an intensity characteristic that varies as a function of the rotational speed of the fan.

The present invention advantageously provides an optical speed sensor in which a closed, all-optical circuit is used to provide immunity from environmental factors while providing an accurate indication of rotational speed.

Other objects and further scope of applicability of the present invention will become apparent from the de-

DESCRIPTION OF THE PREFERRED EMBODIMENT

Figure 1:
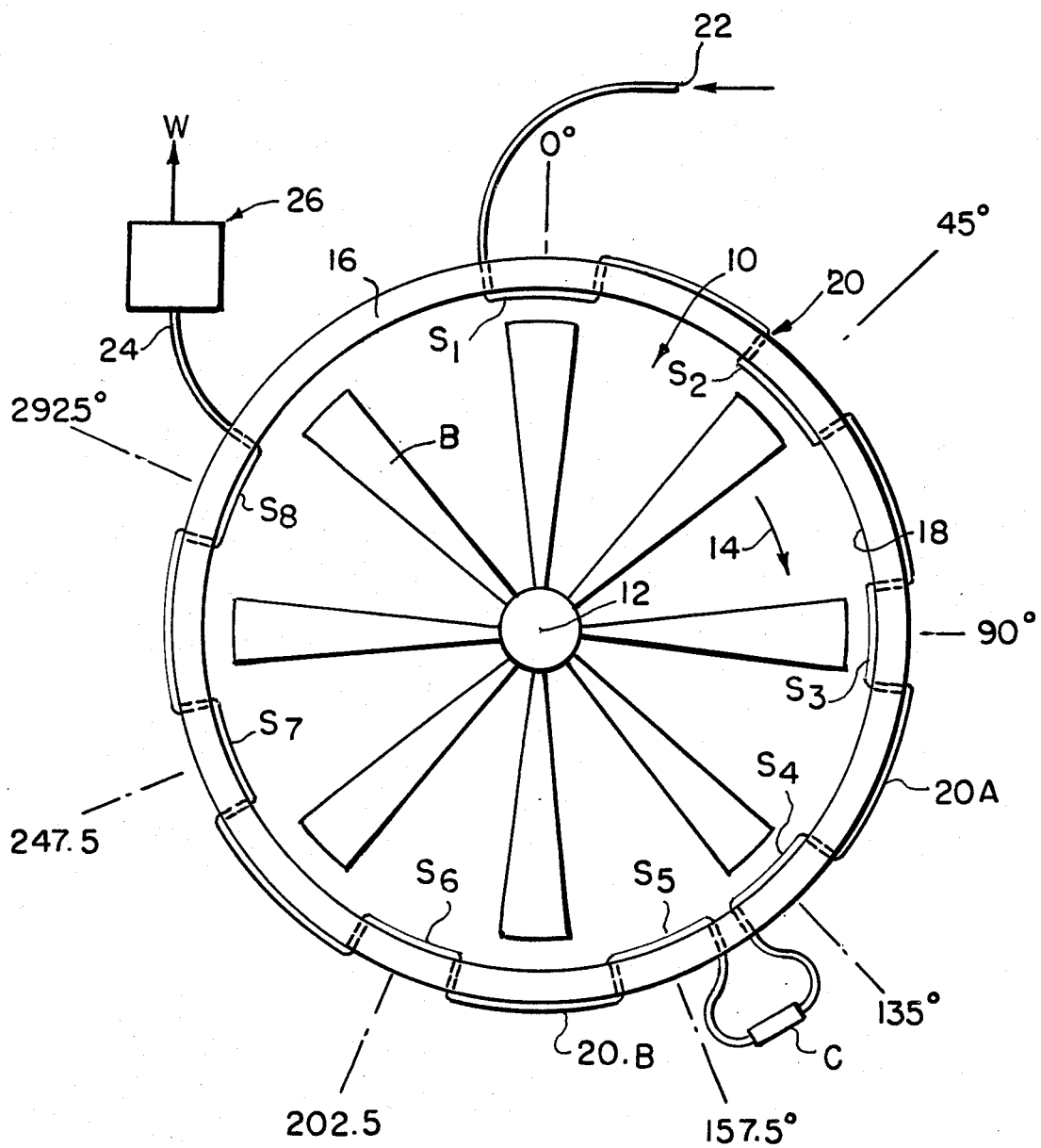
FIG. 1 is a front elevational view, in schematic form, of a rotatably mounted fan with a polarimetric optical speed sensor mounted about the periphery of the fan.

A polarimetric optical speed sensor for determining the rotational speed of a fan or fan-like structure is shown in general form in FIG. 1. As shown, a fan 10, such as the bypass fan of a turbo-fan aircraft engine, is mounted for rotation about an axis 12 in the clockwise direction at a speed w as indicated by the arrow 14. The fan 10 includes N fan blades B that are mounted at equal angular spacings. In the illustrated embodiment, the fan 10 includes eight blades B mounted at 45° angular intervals about the axis 12. A circular cowling 16 or equivalent structure surrounds the fan 10 and is preferably dimensioned so that the interior surface 18 facing the fan 10 is subjected to the pressure waves generated by the remote ends of the moving blades B. In general, the variation in pressure P at any point on the interior surface 18 is a sinsusoidal function of the number N of blades B and the rotational speed w. An optical circuit, designated in general form by the reference character 20, is mounted to the cowling 16 to be affected, as described below, by the pressure variations caused by the moving blades B. Optical energy is introduced into the optical circuit 20 through an input port 22 by a suitable optical source (not specifically shown) and passes through the optical circuit 20 to an output port 24 and to an output-light processor 26 that provides an electrical indication of the speed of rotation of the fan 10.

Figure 3:
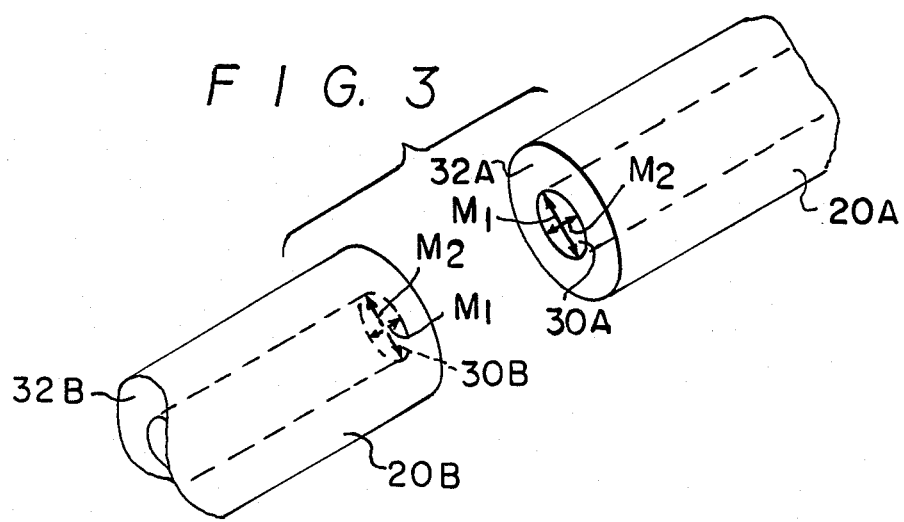
FIG. 3 is an exploded isometric view of an end-to-end butt coupling of two polarization-preserving optical fibers coupled to transpose the orthogonal modes from one fiber to the other.

The optical circuit 20 is formed from a polarization-preserving fiber (not specifically illustrated) which, in general form, includes a light transmitting core surrounded by a cladding having an index of refraction less that than of the core to guide light through the core. The core is configured to support transmission of light having orthogonal polarization modes and preserve the modes as the light is guided in core. Such cores can be formed by controlling the cross-sectional shape of the core, for example, by providing an ellipsoidal cross-section in which the major and minor axes support respective orthogonal modes or by placing a circular core under compressive stresses to cause a relative change in the index of refraction in the stressed direction relative to the less-stressed orthogonal direction. Regardless of the manner by which the polarization-preserving fiber is formed, light having orthogonally polarized components introduced into the fiber will be guided in the core along the fiber with the orthogonal modes preserved. The optical circuit 20, as described more fully below, includes a first optical fiber 20A serially connected to a second optical fiber 20B through a coupler C with the end of the first optical fiber 20A cross-coupled to the second optical fiber 20B to transpose the two modes, that is, the fast axis of the first fiber is coupled to the slow axis of the second fiber and the slow axis of the first fiber is connected to the fast axis of the second fiber. This cross-coupling can be accomplished via an end-to-end butt coupling as illustrated in exploded perspective in FIG. 3. A shown, the first fiber 20A includes a core 30A surrounded by a cladding 32A with the core 30A supporting first and second orthogonal polarization modes as represented in schematic fashion by the arrows $M_1$ and $M_2$. The first fiber 20A is butt coupled to the second fiber 20B with the core 30A and the cladding 32A of the first fiber 20A co-aligned with the core 30B and cladding 32B of the second fiber 20B. The first and second fibers 20A and 20B are rotated relative to one another so that the mode $M_1$ of the first fiber 20A is coupled into the mode $M_2$ of the second fiber and the mode $M_2$ of the first fiber 20A is coupled into the mode $M_1$ of the second fiber 20B to thus effect cross-coupling or transposition of the polarization modes. In addition to the cross-coupling butt coupler C described in relation to FIG. 3, discrete axis translators (not shown) may be used to effect the desired mode transposition through the coupling C.

Figure 2:
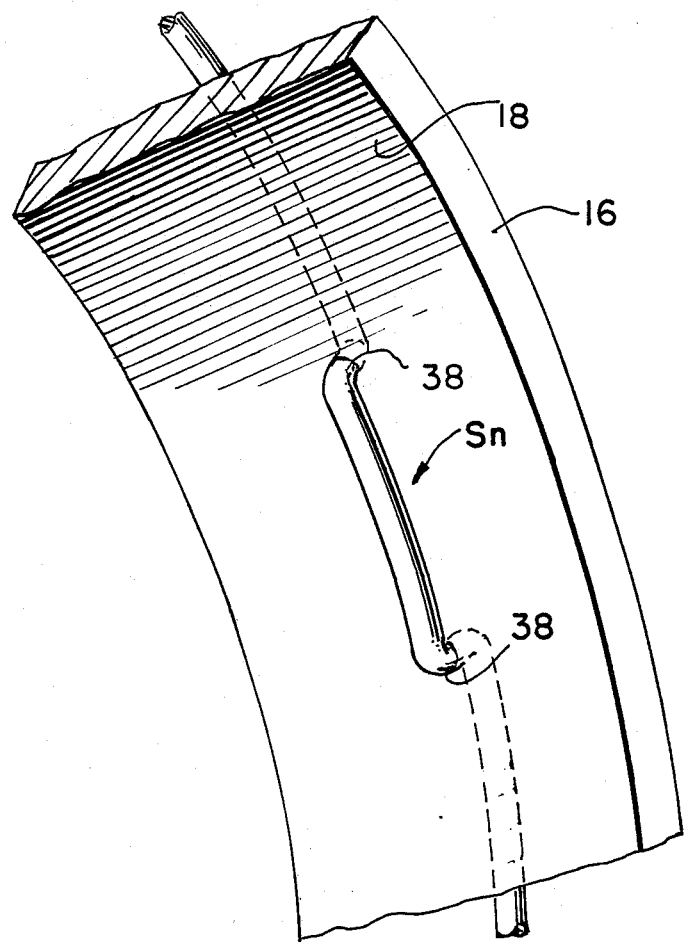
FIG. 2 is a detail view in perspective, of a portion of the polarimetric optical speed sensor of FIG. 1 with a representative fan blade shown in phantom for reasons of clarity.

The optical circuit 20, which includes the first fiber 20A extending between the light input port 22 and the coupling C and the second fiber 20B extending between the coupling C and the light output port 24, is divided into a plurality of sensing segments $S_n$ that are exposed to the pressure variations caused by the movement of the blades B past the sensing segment $S_n$. As shown in FIG. 2, a sensing segment $S_n$ is formed by presenting a selected length L of the optical fiber to the pressure variations induced by the movement of the blades B. In the preferred form, holes 38 are formed in a selected angular relationship in the wall of the cowling 16 and the optical fibers 20A and 20B threaded through the holes 38 to place the selected lengths L of the fiber on the inside surface 18 of the cowling 16 adjacent to the locus described by the remote ends of the blades B as the fan 10 rotates about the axis 12. The optical fibers 20A and 20B may be held in place by adhesive or preformed attachment structures (not shown). The orientation of the optical fibers 20A and 20B is such that the optical circuit 20 is oriented with one of the polarization axes, e.g., the $M_1$ orientation, dominantly affected by the pressure variations. In addition to threading the optical fibers 20A and 20B through the holes 38, an equivalent structure can be provided by placing the entire optical circuit 20 on the interior surface 18 of the cowling 16 and selectively shielding or otherwise isolating alternate sections of the optical fibers 20A and 20B from the pressure variations to thus define pressure responsive segments $S_n$ between the shielded or isolated portions. The path length of each segment Sn should be sufficiently long to cause the pressure variations consequent to fan blade B movement to affect the light guided through the core of the fibers.

The placement of the various sensing segments $S_n$ and their angular relationship are varied to phase modulate the light transmitted through the optical fibers 20A and 20B. More specifically, the first four sensing segments $S_1$, $S_2$, $S_3$, and $S_4$ (representing N/2 sensing segments in the case of the preferred embodiment) are defined from the first optical fiber 20A and positioned at an angular spacing of 360°/N, and the second four sensing segments $S_5$, $S_6$, $S_7$, and $S_8$ are formed from the optical fiber 20B and likewise positioned at an angular spacing of 360°/N but offset from the first four sensing segments by 360°/2N. In the illustrated case of N=8, the first four sensing segments $S_1$, $S_2$, $S_3$, and $S_4$ are located at 0°, 45°, 90°, and 135°, and the second four sensing segments $S_5$, $S_6$, $S_7$, and $S_8$ are located at 157.5°, 202.5°, 247.5°, and 292.5°. The location of the first set of four sensing segments $S_1$, $S_2$, $S_3$, and $S_4$ can be expressed as $$\theta_1 = (m-1)2\pi/N$$

and the location of the second set of four sensing segments $S_5$, $S_6$, $S_7$, and $S_8$ can be expressed as $$\theta_2 = (2m-1)\pi/N,$$

where N represents the number of blades B.

As each fan blade B passes a sensing segment $S_n$, the local hydrostatic pressure varies in a periodic manner as a function of the initial, ambient pressure P, the number N of blades B, and the rotational speed w. The portion of the optical fiber that defines each sensing segment $S_n$ is subjected to a pressure-induced stress which is effective to cause a change in phase of the polarized light transmitted in the core 30A or 30B, this phase change represented as $$\Delta\phi = 2\pi LP/F$$

where f is a constant unique to the optical fiber for any given wavelength and L is the path length (FIG. 2) of the fiber at each sensing segment $S_n$.

For the first four sensing segments $S_1$, $S_2$, $S_3$, and $S_4$, which are effectively connected in series, the individual phase changes are additive as follows:

$$\Delta\phi_1 = N/2[2\pi L/f][P_o + (P_1/2)(1+\cos(Nwt))] + \Delta_1,$$

where w represents rotational speed, t represents time, $\Delta_1$ represents the cumulative phase changes due to environmental conditions and the inherent birefringence of the optical fiber used to form the optical circuit 20, and the second bracketed term represent the pressure variation as a function of fan speed. In a similar manner, the individual phase changes for the second set of sensing segments $S_5$, $S_6$, $S_7$, and $S_8$ are additive as follows:

$$\Delta\phi_2 = N/2[2\pi L/f][P_o + (P_1/2)(1+\cos(Nwt+\pi))] + \Delta_2,$$

where $\Delta_2$ represents the cumulative phase changes due to environmental conditions and the inherent birefringence mentioned above.

Because the transmission axes for the optical fiber 20A and 20B are transposed at the coupling C (FIGS. 1 and 3), the phase shifts of the optical fibers 20A and 20B are effectively subtracted from one another as follows:

$$\Delta\phi_T = N/2[\pi LP_1/f][\cos(Nwt) - \cos(Nwt+\pi)] + (\Delta_1 - \Delta_2)$$

Assuming that the environmentally induced background phase shift and the inherent birefringence for both the optical fiber portions 20A and 20B are substantially equal, the total phase change can be represented as follows:

$$\Delta\phi_T = (N\pi LP_1/f)\sin(Nwt)$$

The polarmetric fiber optic sensor is thus configured to produce an optical signal output I at the output port 24 that is proportional to the sine of the total phase shift $\Delta\phi_T$ so that the optical signal I is determined as follows:

$$I\alpha\sin[(N\pi LP_1/f)\sin(Nwt)]$$

Where the pressure differences caused by movement of the fan blades B are small, that is, $\Delta\phi_T << 1$, the following relationship holds for the optical signal I evaluated by the output-signal processor 26:

$$I\alpha(N\pi LP_1/f)\sin(Nwt)$$

An optical output is thus provided which is directly related to the rotational speed w of the fan 10 about its axis of rotation 12 and in which environmentally induced background phase shifts and phase shifts that are consequent to the inherent birefringence of the optical fiber are substantially cancelled.

As can be appreciated, the present invention advantageously provides an optical speed sensor in which a closed, all-optical circuit is used to provide an accurate indication of rotational speed with relative immunity from environmental factors.

Thus it will be appreciated from the above that as a result of the present invention, a highly effective polarimetric fiber optic speed sensor is provided by which the principal objective, among others, is completely fulfilled. It will be equally apparent and is contemplated that modification and/or changes may be made in the illustrated embodiment without departure from the invention. Accordingly, it is expressly intended that the foregoing description and accompanying drawings are illustrative of preferred embodiments only, not limiting, and that the true spirit and scope of the present invention will be determined by reference to the appended claims and their legal equivalent.

What is claimed is:

1. An apparatus for sensing the speed of rotation of a fan-like structure about an axis of rotation, the fan-like structure having blades moved about the axis of rotation, the apparatus comprising:

means defining a fiber optic circuit for the transmission of optical energy in first and second polarization modes, said fiber optic circuit having an input port for accepting light from a light source and an output port;

means connected to said fiber optic circuit means for transposing the polarization modes transmitted therein at a point intermediate the input and output ports;

means for supporting said fiber optic circuit means in a fixed relationship adjacent the fan-like structure, said supporting means supporting a selected path length of the fiber optic circuit means between the input port and the transposing means and a selected path length between the transposing means and the output port adjacent a locus described by the moving blades to be subjected to pressure variations caused by the moving blades to alter a characteristic of the optical energy transmitted therein; and means for determining the speed of rotation from the light output of the fiber optic circuit.

2. The apparatus of claim 1, wherein the fan-like structure includes N blades and said support means supports N/2 selected path lengths of the fiber optic circuit means between the input port and the transposing means and N/2 selected path lengths between the transposing means and the output port adjacent a locus described by the moving blades to subject each of the N path lengths to pressure variations caused by the moving blades to alter a characteristic of the optical energy transmitted therein.

3. The apparatus of claim 2, wherein said support means supports said first-mentioned N/2 selected path lengths at an anglular spacing of 360°/N and said second-mentioned N/2 selected path lengths at an angular spacing of 360°/N.

4. The apparatus of claim 3, wherein said first-mentioned N/2 selected path lengths and said second-mentioned N/2 selected path lengths are angularly offset by an angular spacing of 360°/2N.

5. An apparatus for sensing the speed of rotation of a fan having N blades about an axis of rotation, comprising:
a polarization-preserving optical fiber for the transmission of optical energy in first and second polarized orientations;
another polarization-preserving optical fiber for the transmission of optical energy in the first and second dominant polarized orientations;
means for coupling said other optical fiber to said first optical fiber to cross-couple the orientations from the first to the other optical fiber;
means for introducing optical energy into said first optical fiber for transmission through said first and other optical fiber;
means for supporting said first-mentioned and second-mentioned optical fibers in a fixed relationship adjacent a locus described by a selected point on the fan blades to be subjected to pressure variations caused by the moving blades to alter a characteristic of the optical energy transmitted therein, said means supporting said first-mentioned optical fiber to present N/2 lineal segments to said fan blades at an angular spacing of 360°/N and for supporting said second-mentioned optical fiber along the locus to present N/2 lineal segments to said fan blades at an angular spacing of 360°/N offset from said first N/2 lineal segments by an angular spacing of 360°/2N.

6. An apparatus for providing optical energy output having a characteristic responsive to the speed of rotation of a fan having N blades about an axis of rotation, comprising:
a set of N/2 serially connected fiber optic segments of predetermined length for transmitting optical energy in first and second polarization modes, said segments supported in a fixed relationship adjacent a locus defined by a selected point on the blades and responsive to pressure variations caused by passage of the blades;
a set of N/2 serially connected fiber optic segments of predetermined length for transmitting optical energy in first and second polarization modes, said segments positioned adjacent the locus defined by a selected point on the blades and responsive to pressure variations caused by passage of the blade; and
means for serially connecting the first set of segments and the second set of segments to transpose the first and second polarization modes, whereby
optical energy transmitted through said first and second sets of N/2 segments is affected by movement of the blades past the segments.

7. The apparatus of claim 6, wherein said first set of segments are angularly spaced relative to each other by an angular spacing of 360°/N and said second-mentioned set of segments are angularly spaced relative to each other by an angular spacing of 360°/N.

8. The apparatus of claim 7, wherein said first-mentioned set of segments and said second set of segments are angularly offset by an angular spacing of 360°/2N.

9. An apparatus for sensing the speed of rotation of a fan having N blades about an axis of rotation and surrounded by a cowling structure, the apparatus comprising:
a polarization-preserving optical fiber for the transmission of optical energy in first and second polarized orientations;
another polarization-preserving optical fiber for the transmission of optical energy in the first and second dominant polarized orientations;
means for coupling said other optical fiber to said first optical fiber to cross-couple the polarized orientations from the first to the other optical fiber;
means for introducing optical energy into said first optical fiber for transmission through said first and other optical fiber;
means for supporting said first-mentioned and second-mentioned optical fibers on the cowling adjacent a locus described by a selected point on the fan blades, said means supporting said first-mentioned optical fiber to present N/2 lineal segments to said fan blades at an angular spacing of 360°/N and for supporting said second-mentioned optical fiber along the locus to present N/2 lineal segments to said fan blades at an angular spacing of 360°/N offset from said first N/2 lineal segments by an angular spacing of 360°/2N.

* * * * *